US012766824B2

(12) United States Patent
Fiorucci

(10) Patent No.: US 12,766,824 B2
(45) Date of Patent: Oct. 20, 2026

(54) PRESS STATION FOR THERMAL TRANSFER CAROUSEL

(71) Applicant: Jeffrey Fiorucci, Edgewood, MD (US)

(72) Inventor: Jeffrey Fiorucci, Edgewood, MD (US)

(73) Assignee: Slant Engineering, LLC, Edgewood, MD (US)

( * ) Notice: Subject to any disclaimer, the term of this patent is extended or adjusted under 35 U.S.C. 154(b) by 145 days.

(21) Appl. No.: 18/625,686

(22) Filed: Apr. 3, 2024

(65) Prior Publication Data

US 2024/0326402 A1 Oct. 3, 2024

Related U.S. Application Data

(60) Provisional application No. 63/456,560, filed on Apr. 3, 2023.

(51) Int. Cl.

*B41F 1/38* (2006.01)
*B41F 1/06* (2006.01)
*B41M 5/03* (2006.01)

(52) U.S. Cl.

CPC .................. *B41F 1/38* (2013.01); *B41F 1/06* (2013.01); *B41M 5/03* (2013.01)

(58) Field of Classification Search

CPC ................ B41F 1/38; B41F 1/06; B41M 5/03
See application file for complete search history.

(56) References Cited

U.S. PATENT DOCUMENTS 3,979,248 A 9/1976 Kussmaul
4,386,993 A 6/1983 Matsuo
4,963,208 A 10/1990 Muncy
(Continued)

FOREIGN PATENT DOCUMENTS

CN 108162579 A * 6/2018 ............. B41F 17/00
CN 208777032 U * 4/2019
(Continued)

OTHER PUBLICATIONS

Machine translation CN108162579A (Year: 2018).*
(Continued)

*Primary Examiner* — Abbas Rashid
*Assistant Examiner* — Wayne K. Swier
(74) *Attorney, Agent, or Firm* — Royal Craig LLC; Royal Craig

(57) ABSTRACT

The invention is that of a heat press designed to produce high-quality thermal transfers comprising a carousel one or more press stations. In preferred embodiments, the carousel comprises a plurality of arms, each bearing a lower platen that may be rotatably shuttled beneath one or more upper platens of one or more press stations. An actuator configured to cause the upper platen to apply pressure and heat to the lower platen is provided. A garment bearing a transferable applique is slid onto the lower platen so the applique may be transferred to the garment as heat and pressure are applied. In preferred embodiments, the upper platen comprises a pressure sensor and temperature sensor and is coupled to a programmable logic controller. An operator of the heat press may select desired temperature, pressure, and dwell time for the transfer, and monitor the process on a connected digital display.

15 Claims, 3 Drawing Sheets

(56) References Cited

U.S. PATENT DOCUMENTS

| | | | | |
|---|---|---|---|---|
| 5,427,025 | A * | 6/1995 | Lee | G07B 17/00467<br>101/378 |
| 5,435,883 | A | 7/1995 | Myers | |
| 5,474,633 | A | 12/1995 | Myers | |
| 6,983,690 | B2 * | 1/2006 | Eppinger | B41F 15/12<br>101/287 |
| 9,486,995 | B2 | 11/2016 | Fiorucci | |
| 2023/0045355 | A1 * | 2/2023 | Galkin | B30B 15/064 |

FOREIGN PATENT DOCUMENTS

| | | | | |
|---|---|---|---|---|
| CN | 217047904 | U * | 7/2022 | |
| CN | 115464974 | A * | 12/2022 | B41F 15/14 |
| WO | WO-2010110276 | A1 * | 9/2010 | B41J 11/0021 |

OTHER PUBLICATIONS

Machine translation CN208777032U (Year: 2019).*
Machine translation WO2010110276A1 (Year: 2010).*
Machine translation CN217047904U (Year: 2022).*
Machine translation CN115464974 (Year: 2022).*

* cited by examiner

PRESS STATION FOR THERMAL TRANSFER CAROUSEL

CROSS-REFERENCE TO RELATED APPLICATIONS

This application claims the benefit of priority of U.S. Provisional Patent Application 63/456,560, filed Apr. 3, 2023, the contents of which are incorporated by reference herein in their entirety.

STATEMENT REGARDING FEDERALLY SPONSORED RESEARCH OR DEVELOPMENT

The invention described in this application was made without the benefit of federal funding.

BACKGROUND OF THE INVENTION

The present invention relates generally to fabric lamination and transfer equipment and, more particularly, to an improved heat press for thermally transferring various transfers including foil onto garments, as well as curing base or final prints on manual or automatic textile screen print presses.

Thermal transfer presses are used for transferring appliques from release paper onto fabric, such as T-shirts, as well as curing base prints such as titanium dioxide ($TiO_2$) undercoats or final prints from either manual or automatic textile screen print presses.

Typically an operator will place a garment, such as a shirt, onto the top of a lower permanent platen, and an upper platen is manually or automatically pressed downward into contacting relationship with the lower platen. Pressed and heated areas of the applique become adhered to the garment.

There are a variety of heat presses for transfer printing. For example, U.S. Pat. No. 4,386,993 discloses a press in which the upper platen moves relative to the lower platen by way of a cam and rocking member. U.S. Pat. No. 3,979,248 discloses a decal press with a motor driven upper platen. U.S. Pat. No. 5,435,883 discloses a hand operated press with adjustment for the gap between the platens. U.S. Pat. No. 5,474,633 discloses a press with a pneumatic engager to press the upper platen onto the lower platen and a timer mechanism. U.S. Pat. No. 4,963,208 discloses a system for applying a decorative device using a swingable upper platen.

The transfer process requires a specialized heat press capable of applying extremely uniform temperature and pressure across the silk-screened garment. The present applicant owns U.S. Pat. No. 9,486,995, which discloses and claims a hot press having a spring-mounted platen for foil transfers that can accommodate minor variations in garment thickness and produce a high-quality foil transfer.

Unfortunately, the foregoing and other prior art presses are fixed-bed single-station presses that require substantial structural reinforcement to withstand the pressures required to apply heat transfers. The operator is required to place the garment onto a stationary lower platen, compress the upper platen downward (manually or automatically) into contacting relationship with the lower platen, separate and then remove the garment. Pressed and heated areas of the applique become adhered to the garment.

What is needed is a more efficient carousel-format heat press in which the garment can be loaded onto a lower platen, and the lower platen rotatably shuttled into a press station that applies a spring-mounted upper platen.

SUMMARY OF THE INVENTION

The invention described herein comprises a carousel-format heat press in which the garment can be loaded onto a lower platen, the lower platen rotatably shuttled into a press station that applies a spring-mounted upper platen, and the upper platen compressed downward to apply a hot transfer. The carousel heat press generally comprises a freestanding press assembly with a spring-mounted upper platen, an actuator engaged to the upper platen, and a riser stand for elevating and supporting the upper platen and actuator. The riser stand includes a floor platform supporting the spring-mounted upper platen assembly, which is oriented downward and suspended from a first height-adjustable stand, spaced apart from a second height-adjustable stand. The spring-mounted upper platen assembly is thereby suspended directly overtop the second height-adjustable stand. Rather than a fixed, stationary lower platen, the lower platen is supported at the distal end of an arm that extends inward to an axis of rotation, and multiple platens so-supported may be so mounted carousel-style. This way, a garment can be loaded onto the lower platen, and the lower platen rotatably shuttled into a freestanding press assembly directly below the spring-mounted upper platen. An operator can manually or automatically apply the spring-mounted upper platen downward against the lower platen, and a second height-adjustable stand directly beneath the lower platen bears the additional weight. Specifically, the support arm is depressed downward until it abuts the second upright height-adjustable stand, which thereupon bears the excess weight.

The foregoing design facilitates a carousel-type assembly line in which a garment may be freely loaded onto the lower platen, and then more expediently rotated into the press station to another lower platen to apply different transfer components, or to cure base or final prints from manual or automatic textile screen print presses.

Multiple lower platens may be rotatably shuttled carousel-style from press station to press station. The press stations are freestanding and can be moved for more flexibility. Still, they apply uniform pressure and temperature despite minor variations in garment thickness and deliver a high-quality thermal transfer.

BRIEF DESCRIPTION OF THE DRAWINGS

Other objects, features, and advantages of the present invention will become more apparent from the following detailed description of the preferred embodiments and certain modifications thereof when taken together with the accompanying drawings in which.

I. DETAILED DESCRIPTION OF THE INVENTION

Applicant's invention is a novel carousel transfer press capable of one or multiple radially oriented spring-biased stations for foil transfers, laminations and other transfers.

Figure 1:
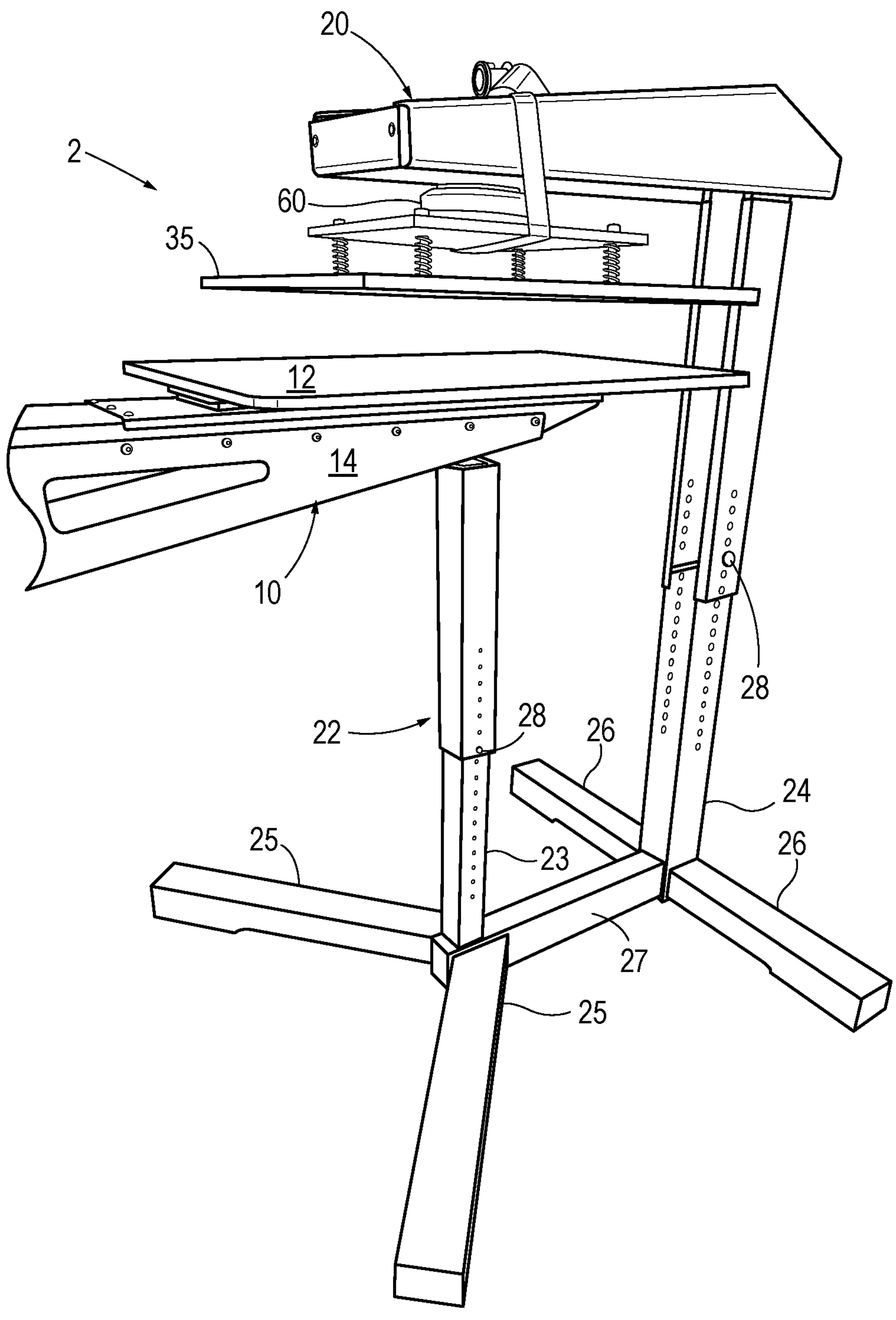
FIG. 1 is a perspective view of a heat press according to an embodiment of the invention.

FIG. 1 is a perspective view of one exemplary press station 2 according to an embodiment of the invention. The press station 2 generally comprises a freestanding and repositionable press 20 that suspends a downwardly oriented spring-mounted upper platen 35 (to be described) above a carousel-mounted workstation 10 with lower platen 12 that can be rotated into position beneath press 20 on an extended arm 14. It is more efficient to load a garment onto the lower platen 12 out in the open, then rotate the lower platen 12 into the press station 2, apply the transfer, then rotate the lower platen 12 back out of the press station 2 and remove the finished garment. The press stations 2 are freestanding and can be moved for more flexibility. Moreover, with this configuration multiple press stations 2 may be radially oriented about a common center, and the workstations 10 with lower platens 12 may be rotated from press 20 to press 20 carousel-style on their extended arms 14 about a common axis of rotation. One skilled in the art will understand that the extended arms 14 may be rotatable manually or motor-driven, such that each lower platen 12 may be conveniently rotated from press 20 to press. A carousel-type assembly line may be desirable to rotate a workpiece from one press station 2 to another to apply different transfer components. In all cases the press stations 2 apply uniform pressure and temperature despite minor variations in garment thickness and deliver a high-quality thermal transfer.

In the illustrated embodiment, the press 20 includes a riser assembly 22 that includes a floor platform supporting two spaced-apart upright stands 23, 24. The entire floor platform may be formed of metal tubing either bent or discrete lengths of struts welded together. In addition, tubular struts may be replaced by I-beams or any other suitable non-tubular strut as a matter of design choice. The illustrated floor platform comprises a pair of forward legs 25 that project both forward and lateral to the forward upright stand 23, a pair of rearward legs 26 that project laterally of the rearward upright stand 24, and a connecting strut 27 that connects rearward legs 26. Both upright stands 23, 24 comprise height-adjustable telescoping tubular sections with set-pins 28. The forward upright stand 23 is height-adjustable within a range of from 1.5' to 3' and serves to provide downward reinforcement to the platen 12 and arm 14. The rearward upright stand 24 is taller than the forward stand 23, height-adjustable within a range of from 2.5' to 4', and serves to support and elevate the press 20 overtop the platen 12. The press 20 itself comprises a spring-mounted upper platen assembly that may be pressed against the lower platen 12 by a pneumatic actuator 60.

Figure 2:
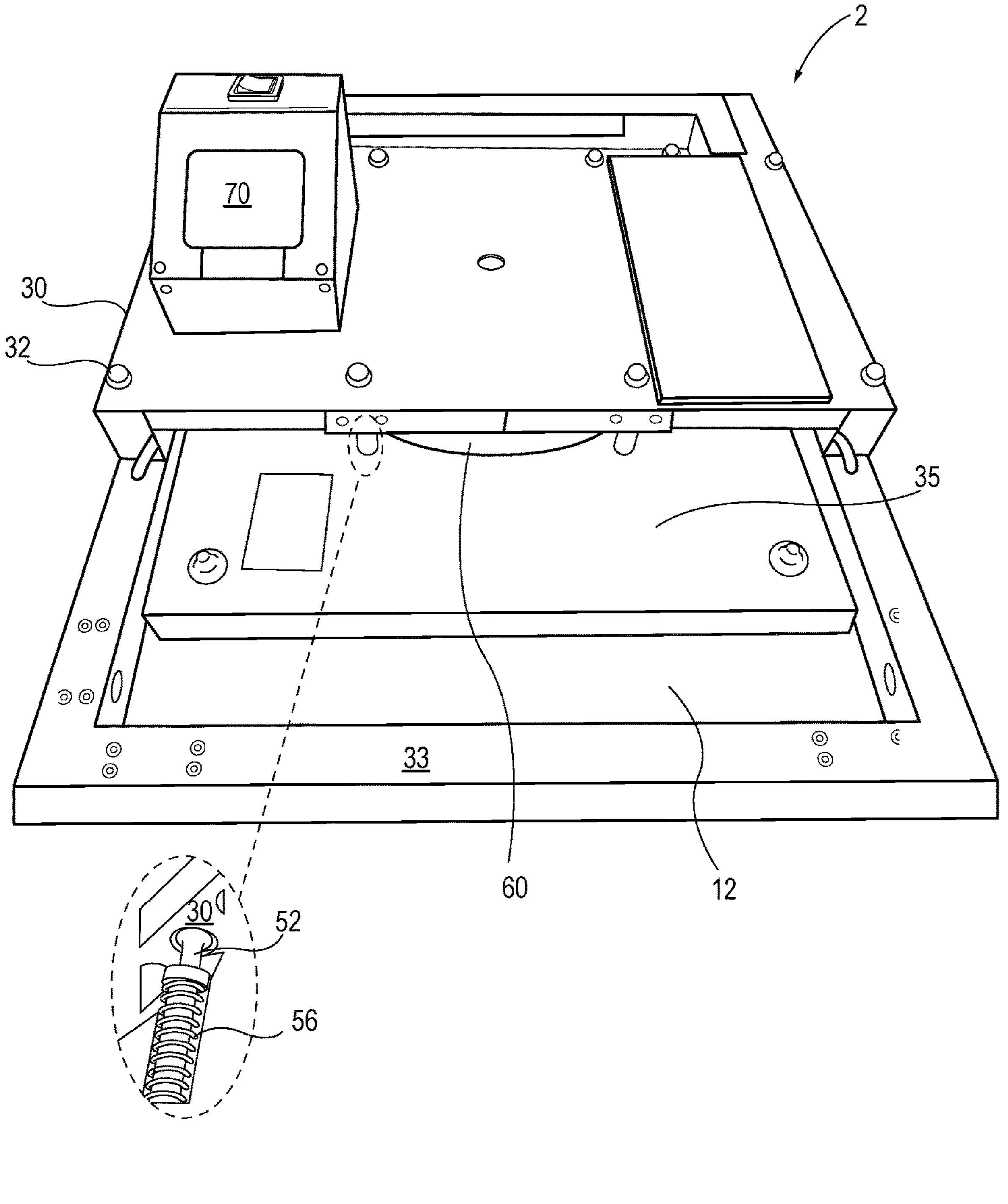
FIG. 2 is an exploded perspective view of an embodiment of a heat press as described herein.

FIG. 2 is an exploded perspective view of an embodiment of press 20. Heat press 2 generally comprises a spring-mounted upper platen 35 that may be pressed against the lower platen 12 by a centrally mounted pneumatic actuator 60.

The upper platen 35 is supported within a rectangular frame 33 formed of tubular steel or the like, and upper platen 35 is dimensioned to fit closely inside rectangular frame 33. Upper platen 35 is supported within frame 33 by a support truss 30 that is affixed to the top edges of frame 33 by screws 32, truss 30 forming an overhead support straddling the platen 35 along its length. The actuator 60 may be centrally suspended by the truss 30 and attached thereto. Alternatively, the actuator 60 may be attached to the platen 35 and extendable upward against overhead truss 30. The floating upper platen 35 is supported overtop frame 33 by truss 30, suspended by four shoulder bolts 52 held captive in truss 30 (see FIG. 2 inset). Shoulder bolts 52 are floating but held captive in truss 30 by their caps (or nuts or the like) as shown. As seen in the inset of FIG. 2, shoulder bolts 52 enter two-tiered apertures 54 machined through truss 30. Each two-tier aperture 54 includes a first bore slightly larger in diameter than that of the body of shoulder bolt 52 entering truss 30 from the top, and a second bore of slightly larger diameter than the first bore entering truss 30 and contiguous with the first bore for seating the cap of shoulder bolt 52. Each shoulder bolt 52 passes through a corresponding aperture 54 in truss 30 but is held captive therein. The other ends of shoulder bolts 52 may be fixed or similarly floating but held captive in the platen 35 as shown. Compression springs 56 are mounted on each shoulder bolt 54 between the overlying truss 30 and underlying platen 35. This effectively provides a four-post mounting but allows platen 35 a degree of free-floating freedom against the bias of springs 56.

Figure 3:
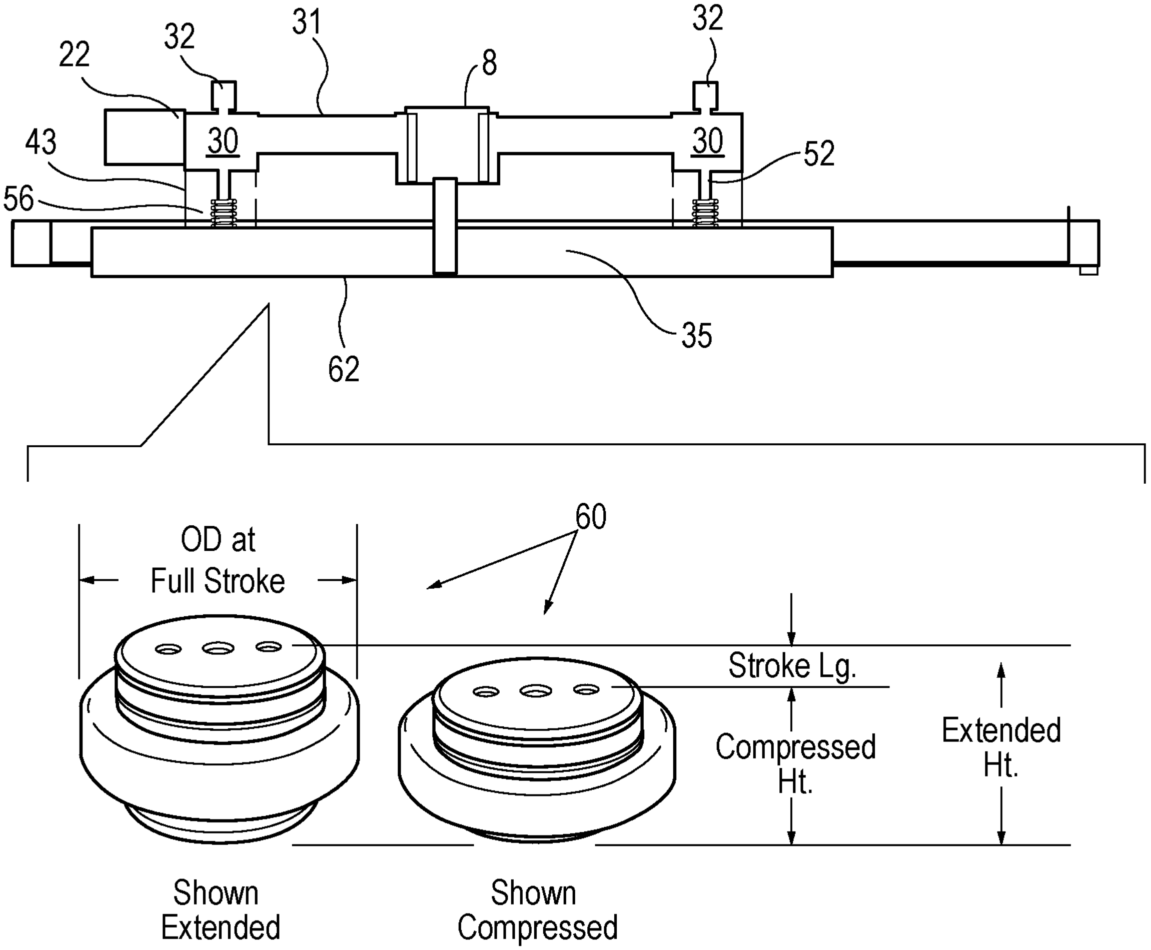
FIG. 3 is a side cross-section of the heat press of FIG. 2

FIG. 3 is a side cross-section of platen 35 supported overtop by truss 30 affixed to the top edges of frame 33 by screws 32. Platen 35 comprises a flat rectangular lower plate preferably formed of a highly-thermally-conductive metal such as aluminum and includes one or more heating elements (not shown) such as conventional resistive heating elements and the like, which may be formed as serpentine or otherwise wound throughout the surface area of platen 35. The heating element(s) are coupled to a typical power supply through a switch and/or programmable logic controller (PLC) configured for adjusting the temperature of the heating element. One skilled in the art will also understand that the platen 35 may also embed a thermo-sensor to generate temperature information for the PLC, or alternatively the electrical circuit for the heating element may include a temperature control such as a thermostat. The upper platen 35 may also embed a pressure-sensor. Both thermo-sensor and pressure sensor may be connected to a digital display 70 (FIG. 2) panel-mounted on the truss 30. The display 70 preferably includes a timer as shown to provide the user with pressure (bar), temperature (degrees) and time (seconds) indications. For best results it is usually preferred to ensure a dwell time for the upper platen 35 to be in contact with the lower platen 12 for 3-10 seconds, at a temperature of about 190-200° F., at a pressure of about 2-3 bar.

The inset to FIG. 3 also shows the pneumatic actuator 60 which may be a conventional 1" stroke, ¾" bore spring-return stainless cylinder with fluid inlet and fluid outlet. A conventional pneumatic pump system may be provided to supply or bleed fluid to/from the actuator 60, or a manual mechanical mechanism may be provided for precise control of the downward travel of platen 35.

Referring back to FIG. 1, lower platen 12 is supported distally on extended arm 14 that extends inward toward a central axis of rotation. In use, a garment is slid onto lower platen 12. The lower platen 12 is then rotated into position beneath the upper platen 12 of press 20. The upper platen 35 is downwardly actuated either manually or automatically by actuator 60, thereby applying substantial pressure to the lower platen 12 and garment. The arm 14 could not alone support such pressure, but it is downwardly supported by forward upright stand 23 which bears the entire weight of the press 20. The lower platen 12 is then rotated out of position and the finished garment removed.

Multiple press stations 2 may be radially oriented about a common center, the extended arms 14 all leading inward to an axis of rotation. One skilled in the art will understand that the extended arms 14 may be rotatable about the axis of rotation, either manually or motor-driven, such that each platen 12 may be conveniently rotated from press 20 to press. This facilitates a carousel-type assembly line in which a workpiece may be rotated from one press station 2 to another to apply different transfer components.

The foregoing heat press improves all hot transfers including appliques and foil transfers, and any other transfers or lamination with a four-point floating spring-biased upper platen design and can accommodate minor variations in garment thickness or other irregularities to produce more consistent heat and pressure, and a higher quality transfer.

The above-described embodiment is for the purpose of promoting an understanding of the principles of the invention. It should nevertheless be understood that no limitation of the scope of the invention is thereby intended, such alternations and further modifications in the illustrated device, and such further applications of the principles of the invention as illustrated herein being contemplated as would normally occur to one skilled in the art to which the invention relates.

What is claimed is:

1. A heat press for combined thermal and pressure application of transfers to garments, comprising:

a carousel comprising a plurality of lower platens each supported distally on a corresponding one of a plurality of support arms, the plurality of support arms being radially oriented and rotatable about an axis;

a press assembly including a four-point floating spring-biased upper platen, and an actuator engaged to said upper platen for downward compression thereof, and a stand including a first height-adjustable vertical riser assembly comprising telescoping tubular sections for elevating and supporting the upper platen, and a second height-adjustable vertical riser assembly comprising telescoping tubular sections offset from said first height-adjustable vertical riser assembly and positionable beneath a support arm of said carousel for under support thereof against the compressive force of said press assembly when the upper platen is positioned overtop one of the plurality of lower platens.

2. The heat press according to claim 1, further comprising a plurality of said press assemblies radially oriented from a common center at a distance from said center to enable each spring-biased upper platen to be positioned overtop a corresponding lower platen.

3. The heat press according to claim 2, wherein each one of the plurality of press assemblies applies uniform pressure and temperature to a garment placed on a corresponding lower platen when actuated.

4. The heat press according to claim 1, wherein each of the first and second height-adjustable vertical riser assemblies comprises an inner and outer tube for height adjustment by telescoping to a desired height and locking into position using set pins.

5. The heat press according to claim 1, wherein the first height-adjustable vertical riser assembly is adjustable within a range of 1.5 feet to 3 feet and the second height-adjustable vertical riser assembly is adjustable within a range of 2.5 feet to 4 feet.

6. The heat press according to claim 1, wherein the actuator is configured to bring the upper platen into contact with the lower platen with downward pressure when engaged.

7. The heat press according to claim 1, wherein the upper platen is formed from aluminum.

8. The heat press according to claim 1, wherein the upper platen comprises one or more heating elements, each coupled to a power supply through a programmable logic controller (PLC) coupled to a temperature sensor, the PLC configured for adjusting the temperature of the one or more heating elements.

9. The heat press according to claim 8, further comprising a pressure sensor.

10. The heat press according to claim 9, wherein the temperature sensor and pressure sensor are each coupled to a digital display displaying temperature, pressure and dwell time information.

11. The heat press according to claim 1, wherein the actuator is a pneumatic actuator.

12. The heat press according to claim 1, wherein the upper platen is configured as a four-point floating spring-biased upper platen.

13. A method for thermal transfer of an applique to a garment, the method comprising:

providing a heat press according to claim 1;

sliding a garment comprising an applique on its upper surface onto the lower platen of the heat press;

rotating the lower platen into position beneath the upper platen; and downwardly actuating the upper platen to apply heat and pressure to the lower platen, applique and garment, thereby transferring the applique to the garment.

14. The method of claim 13, wherein the temperature of the upper platen is 190-200 degrees Fahrenheit and the applied pressure is 2-3 bars.

15. The method of claim 13, wherein the dwell time of the upper platen above the lower platen, applique and garment is within a range of 3-10 seconds.

* * * * *